United States Patent [19]

Altman

[11] Patent Number: 4,714,584

[45] Date of Patent: Dec. 22, 1987

[54] FLOW LIMITING HEAD ADAPTER EXTENSION

[75] Inventor: Denis J. Altman, Jeannette, Pa.

[73] Assignee: Westinghouse Electric Corporation, Pittsburgh, Pa.

[21] Appl. No.: 701,053

[22] Filed: Feb. 12, 1985

[51] Int. Cl.[4] ............................ G21C 1/01; G21C 7/00
[52] U.S. Cl. ................................... 376/353; 376/203; 376/281; 376/463
[58] Field of Search ............... 376/353, 449, 463, 243, 376/242, 203, 352, 281, 204, 205

[56] References Cited

U.S. PATENT DOCUMENTS 3,595,748  7/1971  Frisch et al. ................... 376/353 X
3,816,245  6/1974  Bevilacqua ..................... 376/353 X

FOREIGN PATENT DOCUMENTS 2162284  7/1973  France ................................ 376/449

Primary Examiner—John F. Terapane
Assistant Examiner—John S. Maples

[57] ABSTRACT

A device for use in a nuclear reactor which includes a pressure vessel having a vessel head, a core in the vessel, elements for controlling the reactivity of the core, drive rods which pass through the vessel head for displacing the elements, and a plurality of head adapters which pass through the vessel head, each head adapter forming part of a drive rod housing enclosing a respective drive rod, each housing enclosing a region which communicates with the interior of the vessel and which is closed at the top. The drive is associated with a respective housing and constitutes a housing extension including a component for connecting the device to the head adapter forming part of the respective housing, and a component for forming, around the associated drive rod and within the associated housing, a fluid passage having a cross-sectional area not exceeding a selected value at least upon the occurrence of a leak in the respective housing.

17 Claims, 9 Drawing Figures

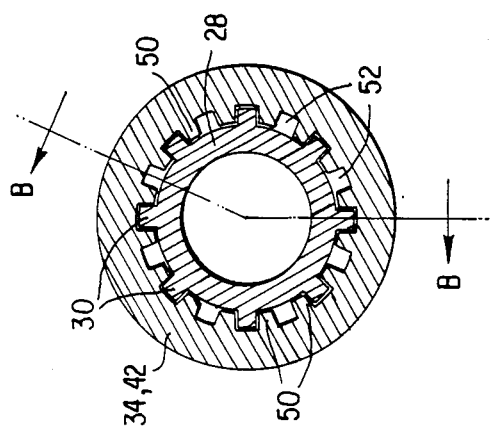
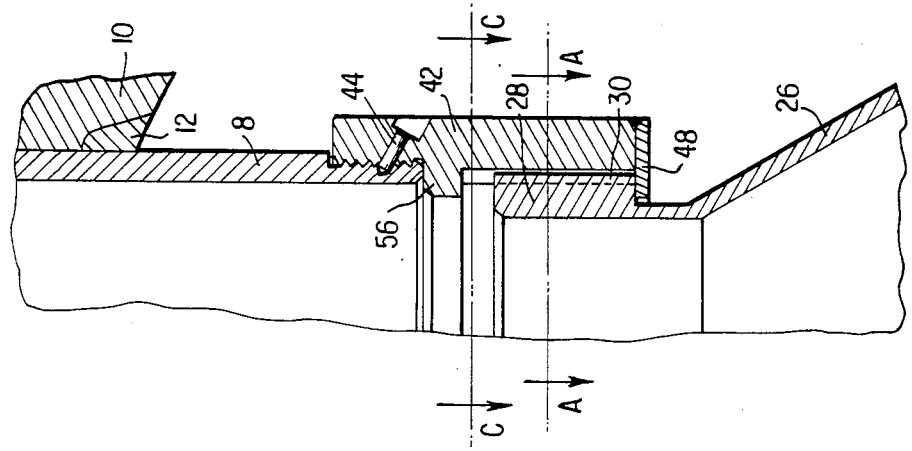
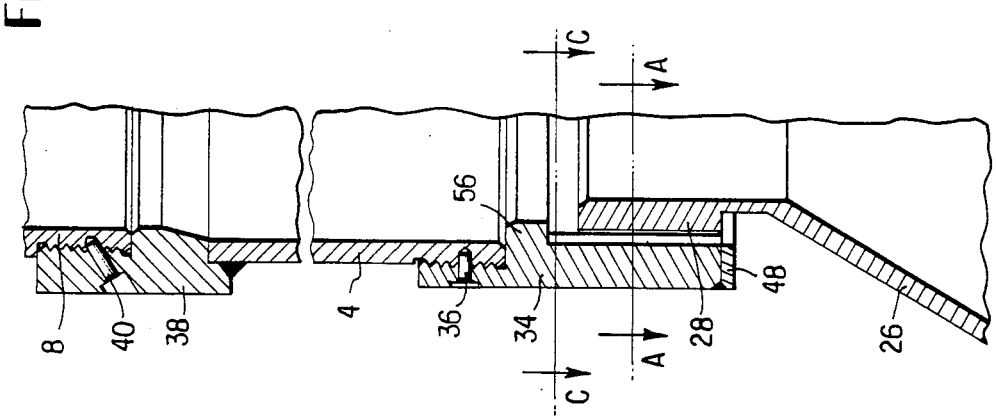

FLOW LIMITING HEAD ADAPTER EXTENSION

BACKGROUND OF THE INVENTION

The present invention relates to head adapter extensions for use in the reactor vessel of a nuclear pressurized water reactor.

Pressurized water reactors which are currently in use include a reactor vessel containing the reactor core and control rods which are movable relative to the core inorder to control its reactivity. Each control rod is suspended from a drive rod that extends through the reactor vessel head to a drive mechanism located above the head.

In order to seal the vessel head at the location of such drive rod, there is provided a cylindrical housing which extends downwardly from the drive mechanism and through a bore in the head to a location within the upper portion of the reactor vessel. The portion of the housing which extends through the vessel head includes a head adaptaer secured in the associated bore, by welding, in order to form a seal between the housing and the vessel head.

The housing further includes a head adapter, or housing, extension which opens, at its lower extremity, to the interior of the vessel and which is generally terminated, at its lower end, by a guide funnel that opens downwardly toward the interior of the vessel and that serves to guide a drive rod into the housing when the vessel head is installed on the vessel body. When such a reactor vessel is assembled, an annular passage which communicates with the interior of the reactor vessel will be created between the drive rod and the associated housing which passes through the vessel head.

In a proposed new pressurized water reactor model, there will also be employed displacer rods which will be movable relative to the reactor core and which will be supported by a drive rod passing upwardly through the vessel head to a drive mechanism. Here again, each drive rod is to be surrounded by a housing having the form described above.

The portion of each housing which passes through the vessel head is made of inconel in order to suitably fasten the vessel head, which is currently made of carbon steel clad with standard stainless steel, to the housing of the drive mechanism itself, which is made of standard stainless steel. BEcause of the expenses involved in the manufacture of inconel parts, this is achieved by forming the part of the housing which is connected to the vessel head as a short head penetration adapter made of Inconel and by then welding a stainless steel pipe to the upper end of the adapter, the upper end of the stainless steel pipe then extending, and being connected to, a further housing enclosing latch components of the drive mechanism.

The head adapter and pipe are joined together by a full penetration weld and it is necessary to take account of the possibility of failure of that weld, which would result in the leakage of liquid out of the reactor vessel via the annular passage between the housing and its associated drive rod.

As protection against the adverse consequences of such a weld failure, or of a leak due to other causes in the housing surrounding the drive rod, it is desirable to limit th cross-sectional area of the flow passage between the interior of the vessel and the source of such a leak to a value of no greater than approximately 5 $cm^2$.

To achieve this, it has previously been proposed to insert a cylindrical tube, known as a thermal sleeve, in the housing to surround the drive rod and to provide orifices between the thermal sleeve and the head adapter such that the cross-sectional area of the remaining flow passage from the interior of the reactor vessel to the region of the drive mechanism was restricted to the above-cited value. In this structure, an extension rod must be provided above the vessel head.

The use of a such a thermal sleeve, however, is accompanied by a number of disadvantages, among which are tht it incrases the total number of components required and the total manufacturing cost.

SUMMARY OF THE INVENTION

It is an object of the present invention to avoid the above-mentioned difficulties.

Another object of the invention is to simplify the structure of the housings associated with the drive rods of a nuclear reactor vessel.

A further object of the invention is to eliminate the need for additional machining of the head adapter of such a housing.

Another object of the invention it to provide a structurally simple solution to the problem of providing a restricted flow passage in the event of a leak in the drive rod housing.

Yet another object of the invention is to reduce the total weight of such housing.

Still another object of the inention is to provide a flow limiting struture which can be connected directly to the head adapter forming part of a drive rod housing.

Still another object of the invention is to permit the use of larger diameter drive rods.

A still further object of the invention is to make possible the provision of an ejection resisting component which will prevent a drive rod, and particularly the head adapter thereof, from being ejected from the pressure vessel in the event of a failure in the weld between the adapter and the vessel head.

Yet another object of the invention is to minimize the number of components rquired to assure the desired flow limitation.

The above and other objects are achieved, according to the present invention by a device for use in a nucler reactor which includes a pressure vessel having a vessel head, a core in the vessel, elements for controlling the reactivity of the core, drive rods which pass through the vessel head for displacing the elements, and a plurality of head adapters which pass through the vessel head, each head adapter forming part of a drive rod housing enclosing a respective drive rod, each housing enclosing a region which communicates with the interior of the vessel and which is closed at the top, the device being associated with a respective housing and constituting a housing extension including means for connecting the device to the head adapter forming part of the respective housing, and means for forming, around the associated drive rod and within the associated housing, a fluid passage having a cross-sectional area not exceeding a selected value at least upon the occurrence of a leak in the respective housing.

BRIEF DESCRIPTION OF THE DRAWING

FIGS. 2a and 2b are views similar to those of FIGS. 1 of a second preferred embodiment of the invention intended for use in a control rod drive mechanism, taken along respective parts of line B—B of FIG. 4.

FIG. 4 is a cross-sectionl view taken along line A—A of FIGS. 2.

DESCRIPTION OF THE PREFERRED EMBODIMENTS

Figure 1B:
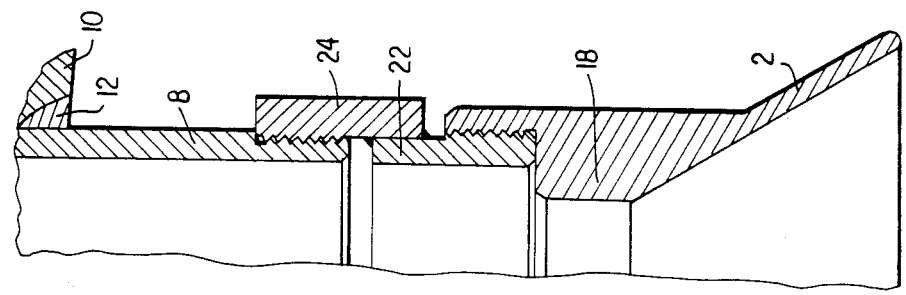
FIGS. 1a and 1b are side views, partly in cross section, illustrating a first preferred embodiment of the invention intended for use in a control rod drive mechanism.
Figure 1A:
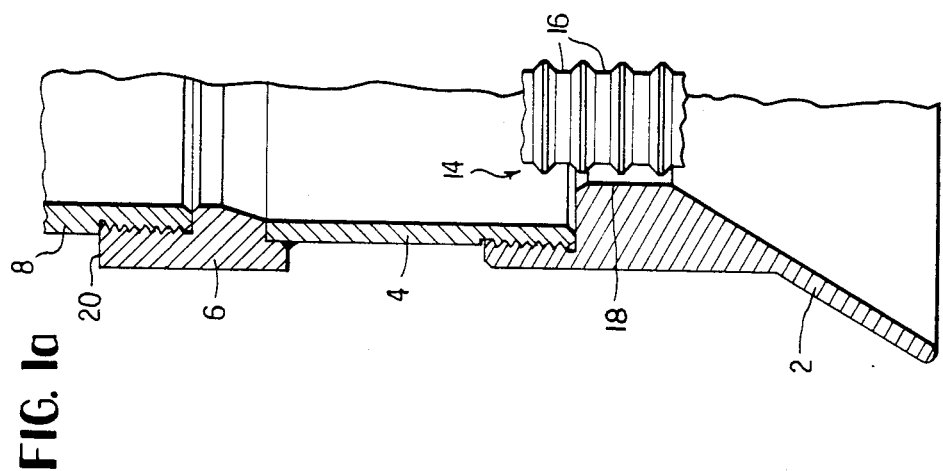

FIGS. 1a and 1b illustrate two versions of a first embodiment of a flow restricting head adapter extension according to the invention. The rods which are to be supported by various mechanisms are distributed across the reactor vessel head. Since the head is domed, the various head adapters pass through the head at different heights. Each extension includes, at its lower end, a guide funnel 2 and it is desirable that all guie funnels be at the same height. To achieve this, the extensions in the central region of the head will have the long form shown in FIG. 1a, while those in the peripheral region will have the form shown in FIG. 1b.

The long version shown in FIG. 1a includes, in addition to guide funnel 2, a length of pipe 4 threaded at its lower end to the upper end of funnel 2. Both pipe 4 and funnel 2 are preferably made of standard stainless steel and pipe 4 is given the length requires to place funnel 2 at the desired height.

Pipe 4 is welded to a collar 6 that is threaded to the lower end of the associated head adapter 8. Collar 6 and adapter 8 are normally made of Inconel and adapter 8 extends in a conventional manner through a bore provided in the reactor vessel head 10 (shown in FIG. 1b). Typically adaptr 8 is inserted into the bore in the vessel head 10 by a shrink fit porcedure and is then secured in the bore by a J weld 12.

Each adapter 8 projects a given distance below the vessel head and each pipe 4 is then dimensioned, in dependence on the height of the head at its respective location, to bring the associated funnel 2 to the desired elelvation.

Each control rod drive mechanism includes a drive rod 14 which carries an associatd control rod and which extends through adapter 8, pipe 4 and funnel 2. One purpose of funnel 2 is to facilitate insertion of rod 14 during installation of the vessel head 10 on the reactor vessel. Insertion is further facilitated by positioning all funnels 2 at the same height.

Drive rod 14 is provided with a succession of annular grooves 16 via which rod 14 can be gripped by a device provided to raise and lower the rod.

According to the invention, funnel 2 is provided at its upper end with an inwardly directed annulus 18 which reduces the radial gap between the maximum diameter portions of rod 14 and funnel 2 to the value required to assure reactor safety in the event of a weld failure at any point in the rod housing above funnel 2. Currently, this is considered to be achieved if the area of the radial gap is no greater than that of a circle 2.54 cm in diameter, or an area no greater than about 5 cm².

The upper end of collar 6 surrounds, and projects radially outwardly from, the lower end of adapter 8 in the region where adapter 8 and collar 6 are threaded together. Thus, collar 6 presents a shoulder 20 which will prevent the head adapter from being expelled from the reactor vessel in the event of a failure of the J weld 12 between adapter 8 and vessel head 10. This ensures that no additional damage to the plant will occur and any leakage will remain small.

The version shown in FIG. 1b is shorter than that of FIG. 1a an is intended for use near the vessel periphery. In this version, adapter 8 is joined to funnel 2 by a collar composed of two circular parts 22, 24 welded together along a cylindrical interface. Part 22 is threaded to funnel 2 and is of standard stainless steel. Part 24 is of inconel and serves as an ejection resisting collar like collar 6 of FIG. 1a.

One advantage of the above-described embodiment is that annulus 18 acts to center drive rod 14 with respect to adapter 8 so that rod 14 will be maintained out of contact with adapter 8, thereby eliminating the danger of adapter 8 becoming worn due to sliding contact with the outer surface of rod 14.

FIGS. 2a and 2b are views similar to those of FIGS. 1a and 1b of another embodiment of a head adapter extension according to the invention for use in a control rod drive mechanism. Here again, the flow path restriction in the event of a weld failure or other event causing a leak is established by forming guide funnel 26 so that at its upper end a flow path having the desired area is creatd between funnel 26 and the drive rod, which i not shown in FIGS. 2 but is identical to rod 14 of FIGS. 1.

Funnel 26 differs from funnel 2 with respect to the form of its upper end in that the upper end of funnel 26 is constituted by a cylinder 28 whose outer cylindrical surface is provided with a plurality of outwardly radially projecting teeth 30 which are spaced apart circumferentially and extend axially along cylinder 28.

In the long version of FIG. 2a, funnel 26 is mounted to the lower end of pipe 4 by means of a stainless steel collar 34 which is threaded to pipe 4 and which can be secured in place by a welded pin 36. Pipe 4, in turn, is joined to the associated head adapter 8 by a collar 38 welded to pipe 4 and threaded to adapter 8. Collar 38 is made of inconel and can be secured in place by a welded pin 40. Collar 38 performs the same function as collar 6 of FIG. 1a.

In the short version of FIG. 2b, funnel 26 is mounted to the lower en of adapter 8 by a collar 42 which is identical to collar 34 except that collar 42 is made of inconel and can vary in length depending on the precise radial location of its associated adapter 8 in head 10.

Figure 3:
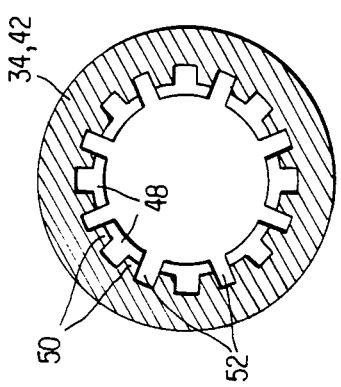
FIG. 3 is a cross-sectional view, taken along line C'C of FIGS. 2, of one component of the embodiment of FIGS. 2.

Collar 34 or 42 supports funnel 26 via a radially inwardly directed flange 48 welded to the collar body. Collar 34 or 42 is porivded with a plurality of inwardly radially projecting teeth 50, shown in FIGS. 3 and 4. Teeth 50 are circumferentially spaced apart and extend axially along the collar.

Teeth 50, as shown in FIG. 4, engage between teeth 30 of funnel 26 so that cylinder 28 is connected to collar 34 by a spline-type connection. Teeth 30 and 50 cooperte to prevent rotation or tilting of funnel 26 relative to pipe 4 or adapter 8 while permitting axial movement of funnel 26 over a defined path relative to funnel 34 or 42.

The number of teeth 30 is one-half the number of teeth 50 so that there are two teeth 50 between each successie pair of teeth 30 and everyother gap 52 between teeth 50 does not contain a tooth 30. Each gap 52 which does not contain a tooth 30 is aligned with a respective correspondingly shaped opening formed in flange 48. Thus, each such opening in flange 48 and the tooth gap 52 with which it is aligned forms part of a seconary flow path to the interior of pipe 4 or adapter 8. The portions of flange 48 between the openings therein support teeth 30 and parts of cylinder 28 to retain cyliner 28 within collar 34, 42.

Flange 48 projects inwardly beyond collar 34 or 42, as shown in FIGS. 2 and 4, to support cylinder 28.

The outlet ends of the secondary flow paths are located above cylinder 28 and below an inwardly projecting flange 56 of collars 34 and 42. Flange 56 is dimensioned so that when funnel 26 has been displaced upwardly to the end of its travel path, the secondary flow paths will be closed by flange 56.

Funnel 26 is dimensioned and shaped so that in the event of a leak in the housing above head 10 surrounding the drive rod, the pressure differential on funnel 26 will drive it upwardly so that the upper end of cylinder 28 is pressed against abutment 56 and the secondary flow paths are closed.

On the other hand, under normal conditions, or in the event of a "scram" condition when a large flow path i.e. a path having a cross-sectional area greater than the selected, or desired, value, is desired, the pressure differential between the ends of funnel 26 will maintain it in the lower position shown in FIGS. 2.

Figure 5B:
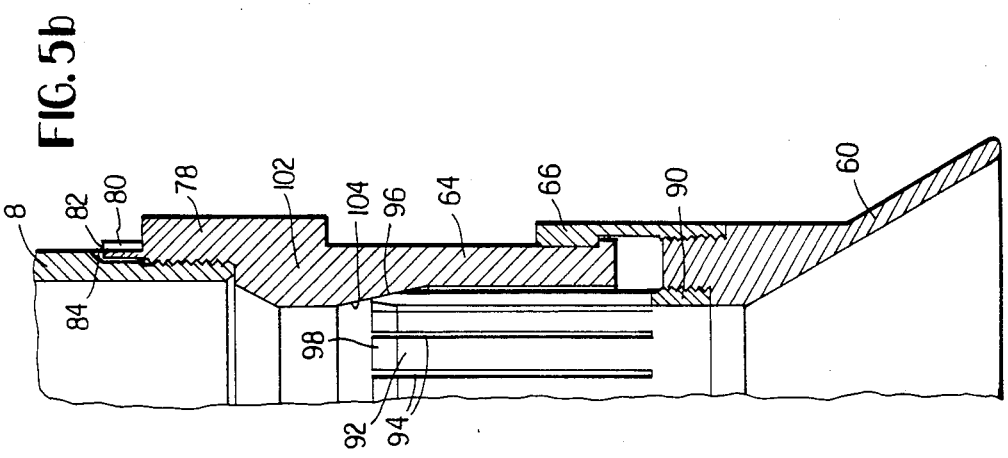
FIGS. 5a and 5b are views similar to those of FIGS. 1 of a third preferred embodiment of the invention intended for use in a displacer rod drive mechanism.
Figure 5A:
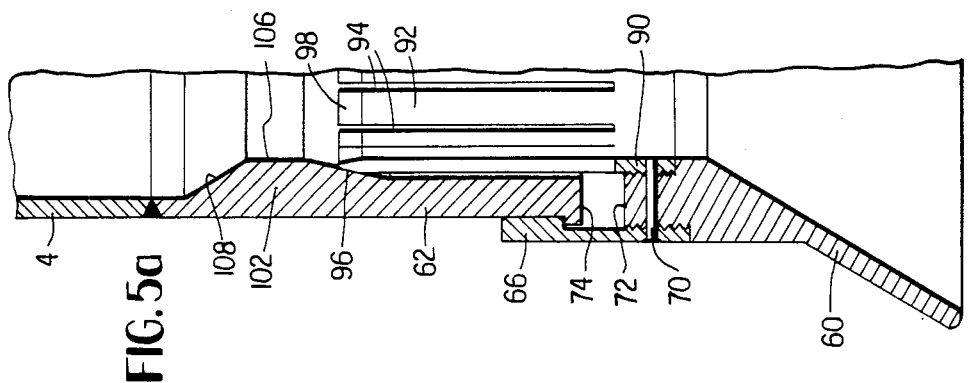

FIGS. 5a and 5b illustrate a third embodiment of an adapter extension according to the invention, which embodiment is particularly suitable for use with displacer rod drive mechanisms, but is also useful with control rod drive mechanisms. Again, FIG. 5a illustrates the long version of the embodiment, while FIG. 5b illustrates the short version thereof.

As in the case of the preceding embodiments, this embodiment includes a guide funnel 60, and funnel 60 is secured to an actuator 62 or 64 via a funnel collar 66. Collar 66 is threaded to the upper end of funnel 60 and is then secured thereto to the upper end of funnel 60 and is then secured thereto by a suitable welded locking pin 70. At its upper end, collar 66 is provided with a radially inwardly directed shoulder which cooperates with a radially outwardly directed shoulder at the bottom of actuator 62 or 64 to maintain collar 66 on actuator 62 or 64, while permitting a certain upward movement of funnel 60 in response to the pressure differential between the upper and lower ends of funnel 60 if a leak should occur in the housing surrounding the drive rod which passes through the head adapter extension.

Funnel 60 is able to move upwardly until its upper axial end surface 72 comes to engage against the lower axial end surface 74 of actutor 62 or 64.

In the long version shown in FIG. 5a, the upper end of actuator 62, which is of standard stainless steel, is welded to pipe 4. Pipe 4, in turn, is secured to the associated adapter head by the same arrangement as that shown in FIG. 2a.

In the case of the short version shown in Figure 5b, actuator 64 differs slightly from actuator 62 by the provision of a radially outwardly extending shoulder portion 78 via which actuator 64 is threaded to head adapter 8. In this embodiment, actuator 64 is made of inconel. Shoulder portion 78 may be provided, at its upper end, with a flexible sheet 80 which extends fully or partly around the circumference of portion 78. Sheet 80 is provided with an inwardly porjecting detent 82 which can engage in a recess 84 porvided in the outer surface of adapter 8 in order to lock portion 78 in position on adapter 8 after portion 78 has been fully threaded onto adapter 8. Of course, other techniques for reliably securing the components together can be employed. Adapter 8 will be secured in the vessel head in the same manner as that shown in FIG. 2b.

Funnel 60 carries, at its interior, a cylindrical member, or collet, 90 which is threaded into funnel 60 and is then secured to funnel 60 by locking pin 70 welded to collar 66. Collet 90 includes an annular base and a plurality of fingers 92 extending upwardly from the collet base.

Fingers 92 are circumferentially separated, when the assembly is in the normal condition shown in FIGS. 5, by axially extending gaps 94. Each finger 92 is tapered at its upper end in that its outer surface is provided with an inwardly inclined portion 96 and its inner surface is provided with an outwardly inclined portion 98.

Actuators 62 and 64 are each provided with an inwardly projecting annular section 102 having an inwardly inclined camming surface 104 that will cooperate with surface portios 96 in a manner to be described below. Above surface 104, each section 102 is provided with an axially extending surface 106 followed by an outwardly sloping surface 108. According to one exemplary form of construction of this embodiment, each surface portion 96 and surface 104 can be inclined at an angle of 10° to the axial direction of the adapter extension, the inclination of each surface portion 96 being with respect to the normal position illustrated in FIGS. 5a and 5b. Each surface portion 98 can have an inclination of 5° to the axial direction, again with respect to the normal conditions shown in FIG. 5, and each surface 106 can have an inclination of 30° to the axial direction.

In the normal condition shown in FIGS. 5, collet 90 will surround a drive rod (not shown) and will be spaced radially from the drive rod and piston to establish an annular gap having a selected cross-sectional area.

Figure 6:
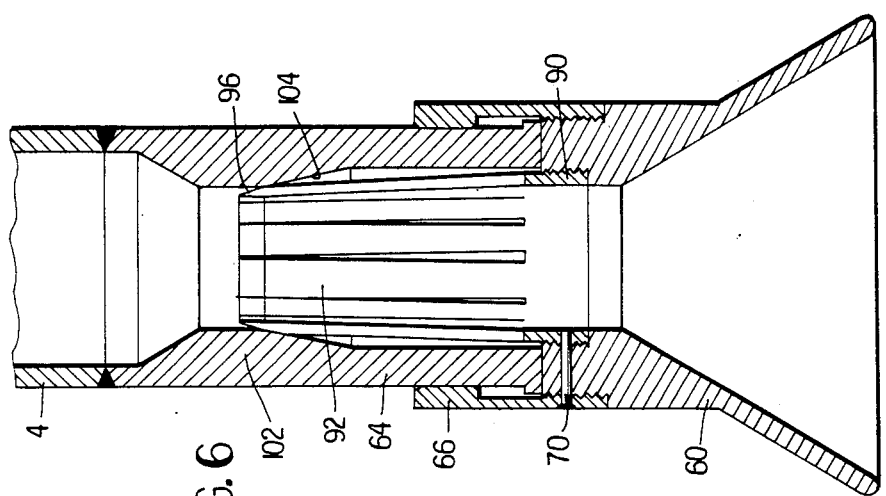
FIG. 6 is a cross-sectional view of the structure of FIG. 5a in its actuated position.

In the event of a leak in the drive rod pressure housing, the differential pressure between the lower and upper ends of funnel 60 will act to force the funnel upwardly until end surface 72 abuts against end surface 74, into the position shown in FIG. 6, which illustrates the embodiment of FIG. 5a in its actuated condition.

In the condition shown in FIG. 6, surface portions 96 of fingers 92 will have moved along surface 104 to deflect the free ends of fingers 92 inwardly to such an extent that the gaps 94 will be closed at the free ends of fingers 92. As a result, the cross section of the annular gap between the upper end of collet 90 and the drive rod will be reduced to the value desired to limit flow through the extension housing in the event of such leak.

The drive rod associated with the embodiment of FIGS. 5 and 6 may be a cylindrical rod provided with piston rings, in which case the annular gap will be defined by the relation between the outer diameter of the piston rings or drive rod and the inner diameter of the upper end of collar 90.

It will be understood that the above description of the present invention is susceptible to various modifications, changes and adaptations, and the same are intended to be comprehended within the meaning and range of equivalents of the appended claims.

What is claimed is:

1. A device for use in a nuclear reactor which includes a pressure vessel having a vessel head, a core in the vessel, elements for controlling the reactivity of the core, drive rods which pass through the vessel head for displacing the elements, and a plurality of head adapters which pass through the vessel head, each head adapter having an inner diameter and forming part of a drive rod housing enclosing a respective drive rod, each housing enclosing a region which communicates with the interior of the vessel and which is closed at the top, said device being associated with a respective housing and constituting a housing extension including means for connecting said device to the head adapter forming part of the respective housing, said means for connecting having a substantially constant inner diameter substantially equal to that of said adapter, and means located at the lower end of said extension for forming, with the associated drive rod and within the associated housing, an annular fluid passage, said means for forming having an inner diameter less than that of said means for connecting so as to give said annular fluid passage a cross-sectional area not exceeding a selected value at least upon the occurrence of a leak in the respective housing.

2. A device as defined in claim 1, wherein said means for forming a fluid passage are carried by said connecting means.

3. A device as defined in claim 1 wherein the selected value is about 5 cm$^2$.

4. A device as defined in claim 1, comprising a guide funnel supported by the respective housing, oriented to open toward the interior of the vessel, and defining at least part of said means for forming a fluid passage.

5. A device as defined in claim 4, wherein said means for forming a fluid passage comprise a radially inwardly extending portion of said guide funnel.

6. A device as defined in claim 4, wherein the vessel head is provided with a bore for the passage of each head adapter and further comprising means defining a radially outwardly projecting shoulder located above said funnel and having an outer diameter greater than the bore provided in the vessel head for passage of the adapter with which said device is associated, said shoulder serving to prevent ejection of said device from the vessel under the influence of the pressure within the vessel.

7. In a nuclear reactor which includes a pressure vessel having a vessel head, a core in the vessel, elements for controlling the reactivity of the core, drive rods which pass through the vessel head for displacing the elements, and a plurality of head adapters which pass through the vessel head, each head adapter having an inner diameter and forming part of a drive rod housing enclosing a respective drive rod, each housing enclosing a region which communicates with the interior of the vessel and which is closed at the top, the improvement comprising a device associated with a respective housing and constituting a housing extension located within said vessel, said device including means for connecting said device to the head adapter forming part of said respective housing, said means for connecting having a substantially constant inner diameter substantially equal to that of said adapter, and means located at the lower end of said extension and supported by said connecting means for forming, with the associated drive rod and within said associated housing, an annular fluid passage, said means for forming having an inner diameter less than that of said means for connecting so as to give said annular fluid passage a cross-sectional area not exceeding a selected value at lealst upon the occurrence of a leak in said associated housing.

8. The combination as defined in claim 7, wherein said device further comprises a guie funnel supported by said respective housing, oriented to open downwardly in said vessel, and defining at least part of said means for forming a fluid passage.

9. The combination as defined in claim 7 wherein the selected value is about 5 cm$^2$.

10. A device for use in a nuclear reactor which includes a pressure vessel having a vessel head, a core in the vessel, elements for controlling the reactivity of the core, drive rods which pass through the vessel head for displacing the elements, and a plurality of head adapters which pass through the vessel head, each head adapter forming part of a drive rod housing enclosing a respective drive rod, each housing enclosing a region which communicates with the interior of the vessel and which is closed at the top, said device being associated with a respective housing and constituting a housing extension including means for connecting said device to the head adapter forming part of the respective housing, and means located at the lower end of said extension for forming, around the associated drive rod and within the associated housing, a fluid passage which constitutes the only path for fluid flow between the interior of the vessel and the interior of the drive rod housing above said means for forming, said means for forming comprising a flow restricting member mounted for movement relative to said connecting means from a normal position to an actuated position in response to the fluid pressure acting thereon as a result of a leak in the respective housing, and said flow restricting member being configured to cooperte with said connecting means for causing said fluid passage to have a cross-sectional area which exceeds a selected value when said flow restricting member is in said normal position and a cross-sectional area which does not exceed the selected value when said flow restricting member is in said actuated position.

11. A device as defined in claim 10 wherein the selected value is about 5 cm$^2$.

12. A device as defined in claim 10, wherein said flow restricting member comprises a hollow cylindrical member mounted on said funnel and projecting from the narrow end of said funnel in the direction of movement of said flow restricting member from its normal position to its actuated position, said hollow cylindrical member being located within said connecting means and including a plurality of axially extending parts separated from one another by axially extending gaps and extending to the end of said hollow cylindrical member which is remote from said funnel, and said connecting means comprise an annular portion facing said hollow cylindrical member and having a camming surface positioned to deflect said axially extending parts radially inwardly when said flow restricting member moves from its normal position to its actuated position for establishing an annular gap between said parts and the drive rod which constitutes the fluid passage.

13. A device as defined in claim 10 wherein said means for forming comprises a guide funnel supported by said connecting means and oriented to open toward the interior of the vessel, said guide funnel being movable relative to said connecting means and forming a structural unit with said flow restricting member.

14. A device as defined in claim 13, wherein said flow restricting member has an upper portion enclosed by said connecting means, and said flow restricting member and said connecting means are constructed to form therebetween a portion of said fluid passage which is open when said flow restricting member is in its normal position and closed when said flow restricting member is in its actuated position.

15. A device as defined in claim 14, wherein said flow restricting member is provided with a plurality of axially extending grooves defining said portion of said fluid passage, and said connecting means comprise a flow blocking member disposed for blocking said channels when said flow restricting member is in its actuted position.

16. In a nuclear reactor which includes a pressure vessel having a vessel head, a core in the vessel, elements for controlling the reactivity of the core, drive rods which pass through the vessel head for displacing the elements, and a plurality of head adapters which pass through the vessel head, each head adapter forming part of a drive rod housing enclosing a respective drive rod, each housing enclosing a region which communicates with the interior of the vessel and which is closed at the top, the improvement comprising a device associated with a respective housing and constituting a housing extension located within said vessel, said device including means for connecting said device to the head adapter forming part of said respective housing, and means supported by said connecting means for forming, around the associated drive rod and within said associated housing, a fluid passage which constitutes the only path for fluid flow between the interior of the vessel and the interior of the drive rod housing above said means for forming, said means for forming comrpising a flow restricting member mounted for movement relative to said connecting means from a normal position to an actuated position in response to the fluid pressure acting thereon as a result of a leak in the respective housing, and said flow restricting member being configured to cooperate with said connecting means for causing said fluid passage to have a cross-sectional area which exceeds a selected value when said flow restricting member is in said normal position and a cross-sectional area which does not exceed the selected value when said flow restricting member is in said actuated position.

17. The combination as defined in claim 16 wherein the selected value is about 5 cm$^2$.

* * * * *